United States Patent [19]

Kurahashi

[11] Patent Number: 4,811,697
[45] Date of Patent: Mar. 14, 1989

[54] INDUCTION SYSTEM WITH E.G.R.

[75] Inventor: Toshio Kurahashi, Fukuroi, Japan

[73] Assignee: Yamaha Hatsudoki Kabushiki Kaisha, Iwata, Japan

[21] Appl. No.: 904,510

[22] Filed: Sep. 5, 1986

[30] Foreign Application Priority Data

Sep. 24, 1985 [JP] Japan .................. 60-210515

[51] Int. Cl.⁴ ............................................ F02M 25/06
[52] U.S. Cl. ............................ 123/52 MV; 123/568; 123/572
[58] Field of Search ......... 123/52 M, 52 MV, 52 MB, 123/568, 572

[56] References Cited

U.S. PATENT DOCUMENTS

| | | | |
|---|---|---|---|
| 3,470,857 | 10/1969 | Stivender | 123/568 |
| 4,011,846 | 3/1977 | Gagliardi | 123/568 |
| 4,069,796 | 1/1978 | Balsley | 123/52 M |
| 4,615,324 | 10/1986 | Choushi et al. | 123/52 MV |
| 4,630,575 | 12/1986 | Hatamura et al. | 123/572 |
| 4,649,876 | 3/1987 | Ohmi et al. | 123/52 MV |

Primary Examiner—Willis R. Wolfe, Jr.
Assistant Examiner—M. Macy
Attorney, Agent, or Firm—Ernest A. Beutler

[57] ABSTRACT

An induction system for a multiple cylinder internal combustion engine that employs a pair of plenum chambers with a common air inlet. An exhaust gas recirculation system is provided for distributing exhaust gases equally to the chambers of the engine by re-introducing the exhaust gases to the common air inlet. In a similar manner, a crankcase ventilating system is provided wherein the crankcase gases are delivered to the common air inlet for equal distribution of the chambers.

17 Claims, 3 Drawing Sheets

INDUCTION SYSTEM WITH E.G.R.

BACKGROUND OF THE INVENTION

This invention relates to an induction system for an engine with exhaust gas recirculation and more particularly to an engine induction and E.G.R. system that ensures equal distribution of the exhaust gases with all cylinders of the engine.

It is well known to provide a system for recirculating a portion of the exhaust gases back into the combustion chambers so as to reduce or control the amount of nitrous oxide in the exhaust gases. Most engines are very sensitive to the amount of exhaust gases which are recirculated, and for this and other reasons, it is very important that the exhaust gases be recirculated equally to all combustion chambers of the engine. Although this can easily be done by providing separate conduits to each of the intake systems or each combustion chamber, such systems become extremely complicated, particularly when considering that the flow of exhaust gases is controlled by an exhaust gas recirculation control valve.

It is, therefore, a principal object of this invention to provide an improved induction system including E.G.R. which will ensure that the exhaust gases are equally recirculated to all of the combustion chambers of the engine.

Recently there has been proposed a type of induction system that is found to produce extremely good performance throughout the entire engine load and speed ranges. Such an induction system is shown in copending application Ser. No. 634,795, entitled "Intake Means Of Internal Combustion Engine" filed July 26 1984, now U.S. Pat. No. 4,649,876, in the name of Masatoshi Ohmi et al, and assigned to the assignee of this invention. The induction system shown in that patent application employs a pair of plenum chambers that are spaced different distances from a given combustion chamber of the engine. Each plenum chamber, serves each combustion chamber through a respective runner, and the runners associated with the closer plenum chamber are shorter and tuned for better performance at high speed. The runners going through the more distant plenum chamber are longer and are tuned for good low speed performance. Although such an induction system is extremely effective, it is difficult to ensure a simple and yet effective system for providing effective exhaust gas recirculation to all combustion chamber of such an engine.

It is, therefore, a still further object of this invention to provide an improved system for introducing exhaust gases to an engine embodying plural plenum chambers.

In connection with emission control, it is also the practice to recirculate crankcase ventilation gases back to the combustion chambers of the engine so that the hydrocarbons and other undesirable constituents in the crankcase ventilation gases are rendered less harmful before they are discharged to the atmosphere. Although not as critical as with exhaust gas recirculation, it is nevertheless desirable to ensure that there is an equal distribution of the crankcase ventilation gases to all of the combustion chambers.

It is, therefore, a still further object of this invention to provide an improved system for introducing crankcase ventilation gases to the combustion chambers of a multiple chamber engine.

BRIEF DESCRIPTION OF THE INVENTION

A first feature of this invention is adapted to be embodied in an induction system for an internal combustion engine that comprises a first plenum chamber and a first series of runners for communicating the first plenum chamber with a first series of combustion chamber intakes. A second plenum chamber is also provided, and a second series of runners communicates the second plenum chamber with a second series of combustion chamber intakes. An air inlet is provided, and means communicate that air inlet with each of the plenum chambers for introducing an air charge to the engine combustion chambers. The engine also incorporates an exhaust system for recycling engine exhaust gases and means for recycling a Portion of the exhaust gases back to the combustion chamber including an E.G.R. inlet communicating with the air inlet.

Another feature of the invention is adapted to be embodied in an induction system for an internal combustion engine having first and second plenum chambers and first and second runners cooperating with first and second series of combustion chamber intakes as described in the preceding paragraph. In accordance with this feature of the invention, the engine is provided with a crankcase ventilation system that has its outlet communicating with the air inlet.

DETAILED DESCRIPTION OF THE PREFERRED EMBODIMENT OF THE INVENTION

Figure 5:
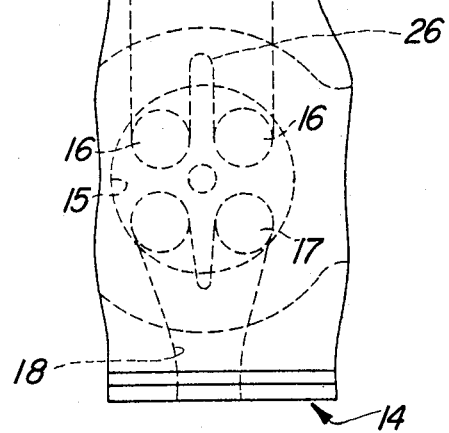
FIG. 5 is a partially schematic top plan view, with a portion broken away, showing the intake system for a given cylinder of the engine.

An engine having an induction, crankcase emission and exhaust gas recirculation system constructed in accordance with an embodiment of the invention is identified generally by the reference numeral 11. The engine 11 is depicted as being of the V-type and includes a crankcase 12 and cylinder block 13 having angularly disposed banks of cylinders. Cylinder head assemblies 14 are affixed to the respective cylinder banks. The cylinder banks are formed with cylinder bores 15 (FIG. 5) that are provided with pairs of intake valves 16 and pairs of exhaust valves 17.

The exhaust valves 17 cooperate with exhaust ports 18 that open through one side of the cylinder head and discharge the exhaust gases to respective exhaust manifolds 19. The manifolds 19, in turn discharge their gases to an exhaust system including exhaust pipes 21.

Engine 11 is provided with an induction system of the type as described in a forenoted co-pending application Ser. No. 634,795. This induction system includes a pair of plenum chambers 22 each of which is disposed in overlying relationship to a respective one of the cylinder head assemblies 14. A plurality of runners 23 extend from each plenum chamber to an intake passage of the respective adjacent cylinder head. This passage 23 serves primarily one of the intake valves 16. Because the passages 23 extend from the plenum chamber 22 to the adjacent cylinder head 14, they are relatively short in length and their effective length is tuned so as to provide good high-speed performance.

In addition, each plenum chamber 22 is provided with a second series of longer runners 24 that extend across the engine and which serve the opposite bank. Specifically, the runners 24 serve the portion of the intake passages associated with the other of the intake valves 16. As should be noted from FIG. 5, however, there is a dividing wall 25 between the runners 23 and 24, and a corresponding wall 26 between the intake valves 16 which is interrupted by a communication passageway 27 so as to provide an area of communication between the runners 23 and 24 in close proximity to the intake valves 16. This communication passageway has been found to significantly improve mid-range performance.

It should be noted that the longer runners 24 have their effective length tuned so as to improve low speed running performance.

Both of the plenum chambers 22 receive air from a common source of inlet air in the form of an air inlet 28 which, in turn, receives filtered air from an air cleaner (not shown). A throttle valve 29 is supported within the air inlet 28 and is connected by means of a suitable linkage mechanism (not shown) to a suitable accelerator mechanism. The air inlet 28 communicates with an air distribution device, indicated generally by the reference numeral 31, which has an inlet opening 32 which communicates with the air inlet device 28 immediately downstream of the throttle valve 29. The distribution device 31 has a generally Y shape that comprises a pair of branch passages 33 which communicate with the individual plenum chambers at their forward ends. The branch passages 33 communicate with the inlet opening 32 by means of communication openings 34 which are spaced forwardly from a rear wall 35 of the distribution device 31. Because of this arrangement, it will be ensured that there is good and equal air distribution to each of the plenum chambers 22.

Figure 1:
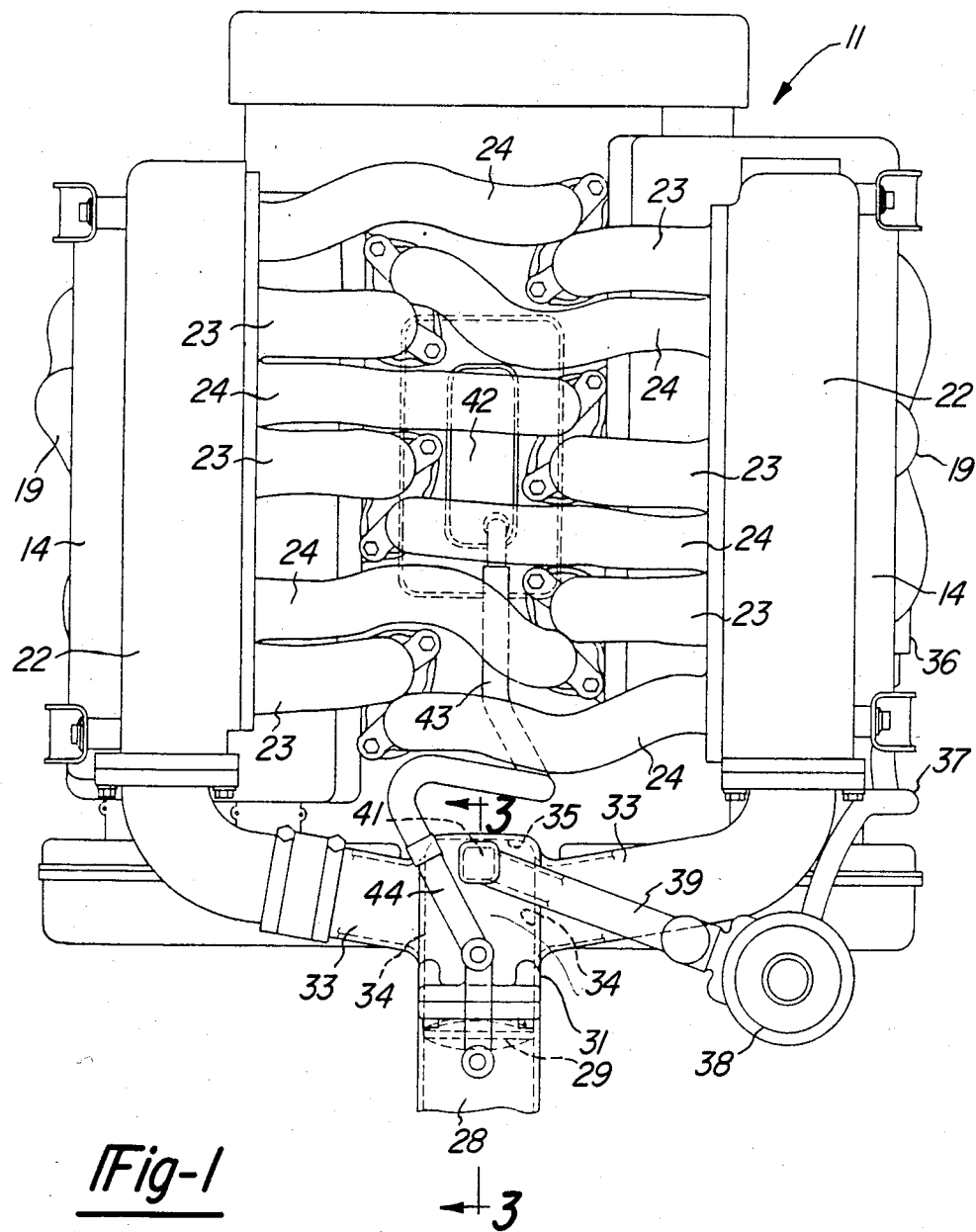
FIG. 1 is a top plan view of an internal combustion engine constructed in accordance with an embodiment of the invention.
Figure 2:
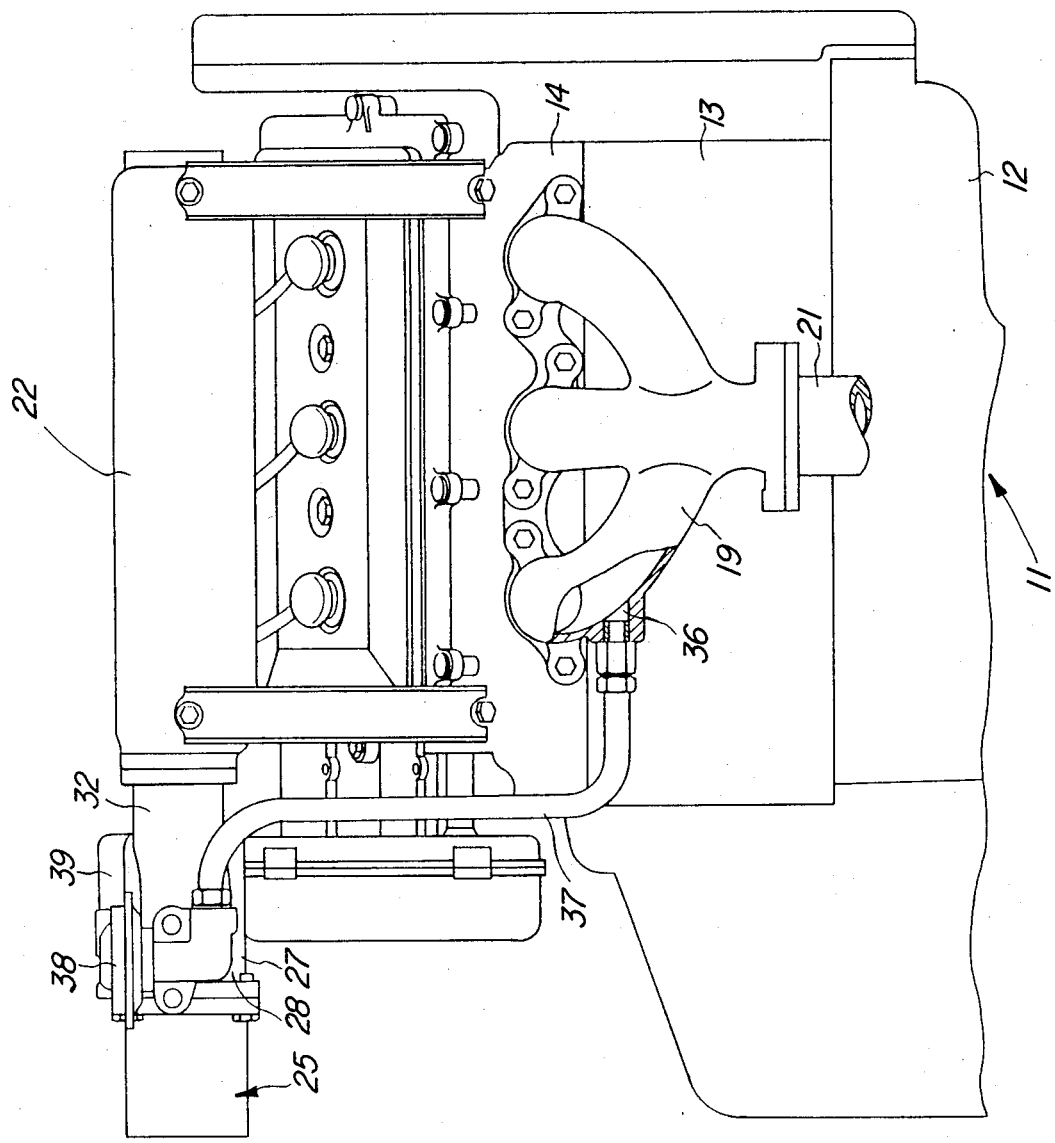
FIG. 2 is a side elevational view of the engine.
Figure 3:
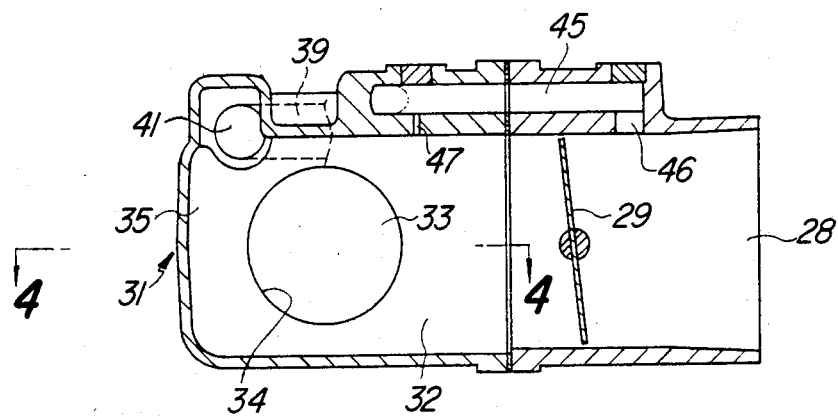
FIG. 3 is an enlarged cross-sectional view taken along the line 3—3 of FIG. 1.
Figure 4:
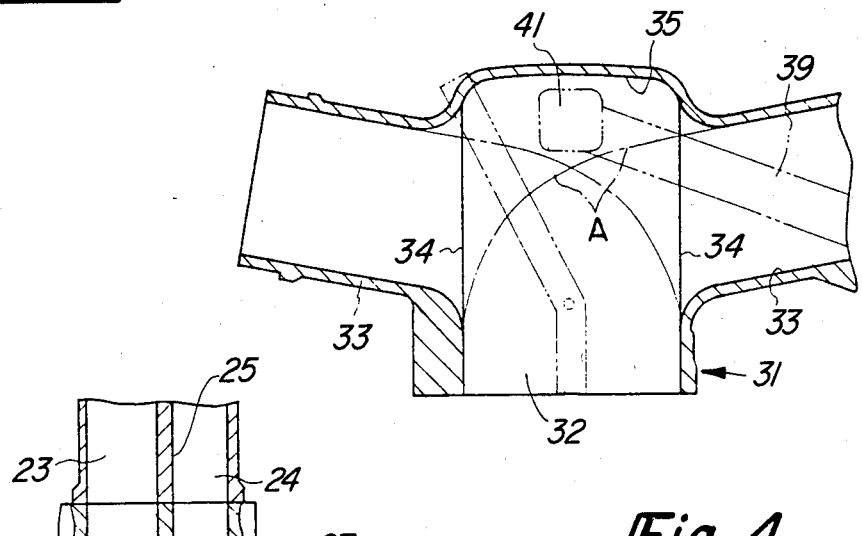
FIG. 4 is a cross-sectional view taken along the line 4—4 of FIG. 3.

In order to control the emissions of nitrous oxide, the engine 11 is provided with an E.G.R. (exhaust gas recirculation) system. It is desirable that the E.G.R. system be relatively simple in construction and have a minimum of piping and plumbing connected with it. However, it is important to ensure good distribution of the exhaust gases that are recirculated with all cylinders of the engine. To this end, one of the exhaust manifolds 19 (FIG. 2) is provided with an exhaust gas top 36 that delivers exhaust gases to a conduit 37. The conduit 37 in turn terminates at an E.G.R. valve 38 which may be controlled in accordance with any desired sequence or system of operation and in turn outputs exhaust gases under its control to a gas conduit 39. The conduit 39 is formed in part in the distribution device 31 and has a discharge opening 41 that opens into the device 31 immediately forwardly of the rear wall 35 and rearwardly of the distribution openings 34. Because of this location of discharge, the exhaust gases which are recirculated will be distributed equally to the passages 33 and, in turn, to the plenum chambers 22. Thus, the exhaust gases which are recirculated will flow equally to the individual cylinders of the engine so as to avoid any unevenness in running.

The engine 11 is also provided with a crankcase ventilating system wherein the crankcase ventilating discharge gases are returned to the combustion chambers for further combustion before discharge to the atmosphere. Like the E.G.R. system, the crankcase ventilation system associated with the engine 11 is extremely simple, but nevertheless is highly effective in ensuring that the crankcase gases will be equally distributed to the individual cylinders of the engine 11 so as to promote even running.

A crankcase ventilating system includes a crankcase ventilating gas discharge 42 that is positioned in the valley of the engine and which discharges crankcase ventilation gases through a conduit 43 to a crankcase gas ventilating conduit 44 formed integrally with the distribution device 31 and air inlet device 28. This conduit 44 is comprised of a passageway 45 that extends through the devices 28 and 31 and which communicates with the inlet device 28 upstream of the throttle valve 29 through a relatively large effective cross-sectional passage 46. In addition, the passageway 45 communicates with the distribution device 31 downstream of the throttle valve 29, but immediately upstream of the branch distribution openings 34 through a relatively small passageway 47. When the engine is idling, the crankcase gases will be delivered at a relatively restricted rate to the induction system through the restricted passageway 47 for equal distribution to the chambers of the engine. However, when running at higher speeds, the crankcase gases will be delivered primarily through the passageway 46 upstream of the throttle valve 29 which will be opened under these conditions so as to again ensure equal distribution and good running.

It should be readily apparent from the foregoing description that the described system provides for effective exhaust gas and crankcase ventilation gas recirculation to the chambers of a multiple cylinder engine while ensuring good distribution to all of the chambers. Even though good distribution is provided, the amount of plumbing and conduits required is substantially reduced since the exhaust gases and crankcase gases are delivered to the common air inlet device of the two plenum chambers.

Those skilled in the art should readily understand that the foregoing description is that of the preferred embodiment of the invention, and that various changes and modifications may be made without departing from the spirit and scope of the invention, as defined by the appended claims.

What is claimed is:

1. In an induction system for an internal combustion engine comprising a first plenum chamber, a first series of runners extending from said first plenum chamber to a first series of combustion chamber intakes, a second plenum chamber, a second series of runners communicating said second plenum chamber with a second series of runners communicating said second plenum chamber with a second series of combustion chamber intakes, a common air inlet for said plenum chambers communicating at one end with the atmosphere and having an outlet end, means for communicating said air inlet outlet end with each of said plenum chambers for introducing an air charge to the engine combustion chambers through said plenum chambers, a throttle valve in said common air inlet for controlling the flow of air into said plenum chamber, an exhaust system for receiving engine exhaust gases, and means for recirculating a portion of said engine exhaust gases back to said combustion chambers including an E.G.R. outlet discharging directly into said common air inlet.

2. In an induction system for an internal combustion engine as claimed in claim 1, wherein the E.G.R. outlet communicates with the common air inlet downstream of the throttle valve.

3. In an induction system for an internal combustion engine as claimed in claim 1, wherein the plenum chambers are disposed in parallel relationship to each other, and the air inlet includes a Y-shaped member having a single inlet portion and a pair of outlet portions each communicating with a respective one of the plenum chambers and the E.G.R. outlet communicates with the single inlet portion.

4. In an induction system for an internal combustion engine as claimed in claim 1, wherein the first series of runners and the second series of runners are arranged in pairs with a runner of each series communicating with the same combustion chamber of the engine.

5. In an induction system for an internal combustion engine as claimed in claim 4, wherein the E.G.R. outlet communicates with the common air inlet downstream of the throttle valve.

6. In an induction system for an internal combustion engine as claimed in claim 1, wherein the engine is of the v-type, and each of the plenum chambers is associated with a respective bank of the engine.

7. In an induction system for an internal combustion engine as claimed in claim 6, wherein the first series of runners and the second series of runners are arranged in pairs with a runner of each series communicating with the same combustion chamber of the engine.

8. In an induction system for an internal combustion engine as claimed in claim 7, further including a crankcase ventilating system having a discharge communicating with the air inlet.

9. In an induction system for an internal combustion engine as claimed in claim 8, wherein the crank case ventilation system communicates with the air inlet through a first, relatively restrictive passageway downstream of the throttle valve, and a second relatively unrestrictive passageway upstream of the throttle valve.

10. An induction system for an internal combustion engine comprising a first plenum, a first series of runners communicating said first plenum chamber with a first series of combustion chamber inlets, a second plenum chamber, a second series of runners communicating said second plenum chamber with a second series of combustion chamber inlets, a common air inlet having an inlet end and an outlet portion, means communicating said air inlet outlet portion with each of said plenum chambers for introducing an air charge to the engine combustion chamber, a throttle valve in said common air inlet for controlling the flow to each of said plenum chambers, and a crankcase ventilating system having a crankcase ventilating air outlet which discharges directly into said common air inlet.

11. An induction system for an internal combustion engine as claimed in claim 10, wherein the crankcase ventilating air outlet communicates with the common air inlet downstream of the throttle valve.

12. An induction system for an internal combustion engine as claimed in claim 10, wherein the plenum chambers are disposed in parallel relationship to each other, and the air inlet includes a Y-shaped member having a single inlet portion and a pair of outlet portions each communicating with a respective one of the plenum chambers and the crankcase ventilating air outlet communicates with the single inlet portion.

13. An induction system for an internal combustion engine as claimed in claim 10, wherein the first series of runners and the second series of runners are arranged in pairs with a runner of each series communicating with the same combustion chamber of the engine.

14. An induction system for an internal combustion engine as claimed in claim 13, wherein the crankcase ventilating air outlet communicates with the common air inlet downstream of the throttle valve.

15. An induction system for an internal combustion engine as claimed in claim 10, wherein the first series of runners and the second series of runners are arranged in pairs with a runner of each series communicating with the same combustion chamber of the engine.

16. An induction system for an internal combustion engine as claimed in claim 15, wherein the first series of runners and the second series of runners are arranged in pairs with a runner of each series communicating with the same combustion chamber of the engine.

17. In an induction system for an internal combustion engine as claimed in claim 12, wherein the crankcase ventilation system communicates with the air inlet through a first, relatively restrictive passageway downstream of the throttle valve, and a second relatively unrestricted passageway upstream of the throttle valve.

* * * * *

UNITED STATES PATENT AND TRADEMARK OFFICE
CERTIFICATE OF CORRECTION

PATENT NO.  : 4,811,697
DATED       : March 14, 1989
INVENTOR(S) : Toshio Kurahashi It is certified that error appears in the above-identified patent and that said Letters Patent is hereby corrected as shown below:

Title page:

Abstract, line 9, "of" should be —to—.

Column 1, line 50, "chamber" should be —chambers—.

Column 2, line 16, "Portion" should be —portion—.

Column 2, line 62, "a forenoted" should be —aforenoted—.

Column 5, line 26, Claim 6, "v-type" should be —V-type—.

Column 5, line 38, Claim 9, "crank case" should be —crankcase—.

Column 5, line 44, Claim 10, after "plenum" insert —chamber—.

Column 6, line 7, Claim 10, delete "and".

Column 6, line 43, Claim 17, "12" should be —10—.

Signed and Sealed this

Ninth Day of July, 1991

Attest:

HARRY F. MANBECK, JR.

Attesting Officer

Commissioner of Patents and Trademarks